US006422475B1

(12) United States Patent
May

(10) Patent No.: US 6,422,475 B1
(45) Date of Patent: Jul. 23, 2002

(54) SELF-SERVICE TERMINAL

(75) Inventor: David C. C. May, Fife (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/589,695

(22) Filed: Jun. 8, 2000

(30) Foreign Application Priority Data

Jun. 29, 1999 (GB) ............................................ 9915191

(51) Int. Cl.[7] ............................................... G06K 19/06
(52) U.S. Cl. ....................................... 235/492; 235/482
(58) Field of Search ................................ 235/375, 441, 235/492, 449, 482

(56) References Cited

U.S. PATENT DOCUMENTS 3,731,085 A * 5/1973 Bostrom ..................... 235/449
3,896,292 A * 7/1975 May et al. .................. 235/375
4,296,315 A * 10/1981 Weimer et al. ............. 235/460
4,586,441 A * 5/1986 Zekich ....................... 235/375
5,151,607 A * 9/1992 Crane et al. ................ 235/375
5,523,739 A * 6/1996 Manneschi .................. 235/492
6,003,677 A * 12/1999 Foley ......................... 235/375
6,149,033 A * 11/2000 Poleshok .................... 235/375

* cited by examiner

*Primary Examiner*—Harold I. Pitts
(74) *Attorney, Agent, or Firm*—Francis L. Conte

(57) ABSTRACT

A self-service terminal (10) incorporating an anti-fraud device is described. The anti-fraud device has a search coil (20) for detecting metal, where the search coil (20) is located in the vicinity of a user interface element (36). The search coil (20) may be located in the throat (22) of the card reader module (**14*d*) so that the search coil (20**) is in the vicinity of an area liable to placement of a fraudulent third party device. A method of preventing fraud at an SST, and an anti-fraud device for use with an SST are also described.

26 Claims, 3 Drawing Sheets

SELF-SERVICE TERMINAL

BACKGROUND OF THE INVENTION

The present invention relates to a self-service terminal (SST), such as an automated teller machine (ATM), incorporating an anti-fraud device. The invention also relates to a method of preventing fraud at an SST, and to an anti-fraud device for use with an SST.

One type of fraud that occurs at an ATM is for a third party to place a small module in front of the ATM's motorized card reader. The module is professionally designed so that it conforms to the appearance of the ATM and is not obvious to a user. The module generally has a magnetic head for reading the magnetic stripe commonly used on banking cards. The module also has electronics associated with the magnetic head for reading the data stored on the magnetic stripe, and has either a memory for storing the read data or transmission apparatus for transmitting the read data to the third party.

When the user enters his card into the motorized card reader via the fraudulent module, the motorized card reader pulls the card in smoothly so that the genuine magnetic card reader can read the card. However, as the card is pulled through the fraudulent module by the motorized card reader, the card reader in the fraudulent module reads the data on the magnetic stripe.

The user is unaware that his card has been read by the fraudulent module because the module is small and unobtrusive and because the module does not impede insertion or removal of the card. Once the card data is known, the third party can re-construct the user's card. A variety of techniques may be used to obtain a user's PIN. For example, a false keypad overlay may be located above the actual keypad, such that when a user enters his PIN, the sequence of digits is recorded by the false keypad. Alternatively, a user may simply be observed while using the ATM and his PIN noted. If the third party can obtain the user's PIN, then the third party has both the card details and the PIN, thereby enabling the third party to generate a counterfeit card and to make withdrawals from the user's bank account without the user's knowledge.

SUMMARY OF THE INVENTION

According to a first aspect of the present invention there is provided a self-service terminal characterized in that the terminal incorporates an anti-fraud device comprising a search coil for detecting metal, where the search coil is located in the vicinity of a user interface element.

The search coil is particularly suitable for detecting the presence of an alien magnetic card reader module because every magnetic card reader head is made of metal.

The search coil may include a ferrite core. Alternatively, the search coil may not include a ferrite core.

Preferably, the search coil is incorporated into a card reader module. Conveniently, the search coil is located in the throat of the card reader module so that the search coil is near to an area liable to attack by a third party module.

The search coil may be annular in shape so that the coil surrounds the entry/exit slot of the card reader module. Alternatively, the search coil may be rod-shaped, or may have any convenient shape.

Preferably, the search coil has a short detecting range, for example less than 10 cm, preferably, less than 5 cm.

The search coil may be permanently activated. Alternatively, the search coil may be activated by the SST detecting a user, or by a user inserting his card into the card reader module.

The anti-fraud device may prevent a card from entering the card reader module if an alien card reader module is detected. Alternatively, the device may initiate an alarm and/or provide a warning to the user or to the owner of the SST.

By virtue of this aspect of the invention, a simple metal detector can be used to detect the presence of an alien magnetic card reader head, and thereby alert the owner of the ATM and/or the user of the ATM to the possibility of fraudulent activity by a third party.

It will be appreciated that the invention is not suitable for use with an SST having a metal component or fascia in close proximity to the search coil.

According to a second aspect of the invention there is provided an anti-fraud device for use with an SST, characterized in that the device comprises a search coil for detecting metal, where the device is adapted for being located in the vicinity of a user interface element of the SST.

According to a third aspect of the invention there is provided a method of preventing fraud at an SST, the method being characterized by the steps of: searching for the presence of metal in the vicinity of a user interface element using a search coil, and generating an alert signal in response to detecting metal.

Preferably, the method further comprises the steps of: determining the length of time for which the metal has been detected; comparing the length of time for which the metal has been detected with a predetermined time; and in the event of the length of time exceeding the predetermined time, generating an alert signal.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
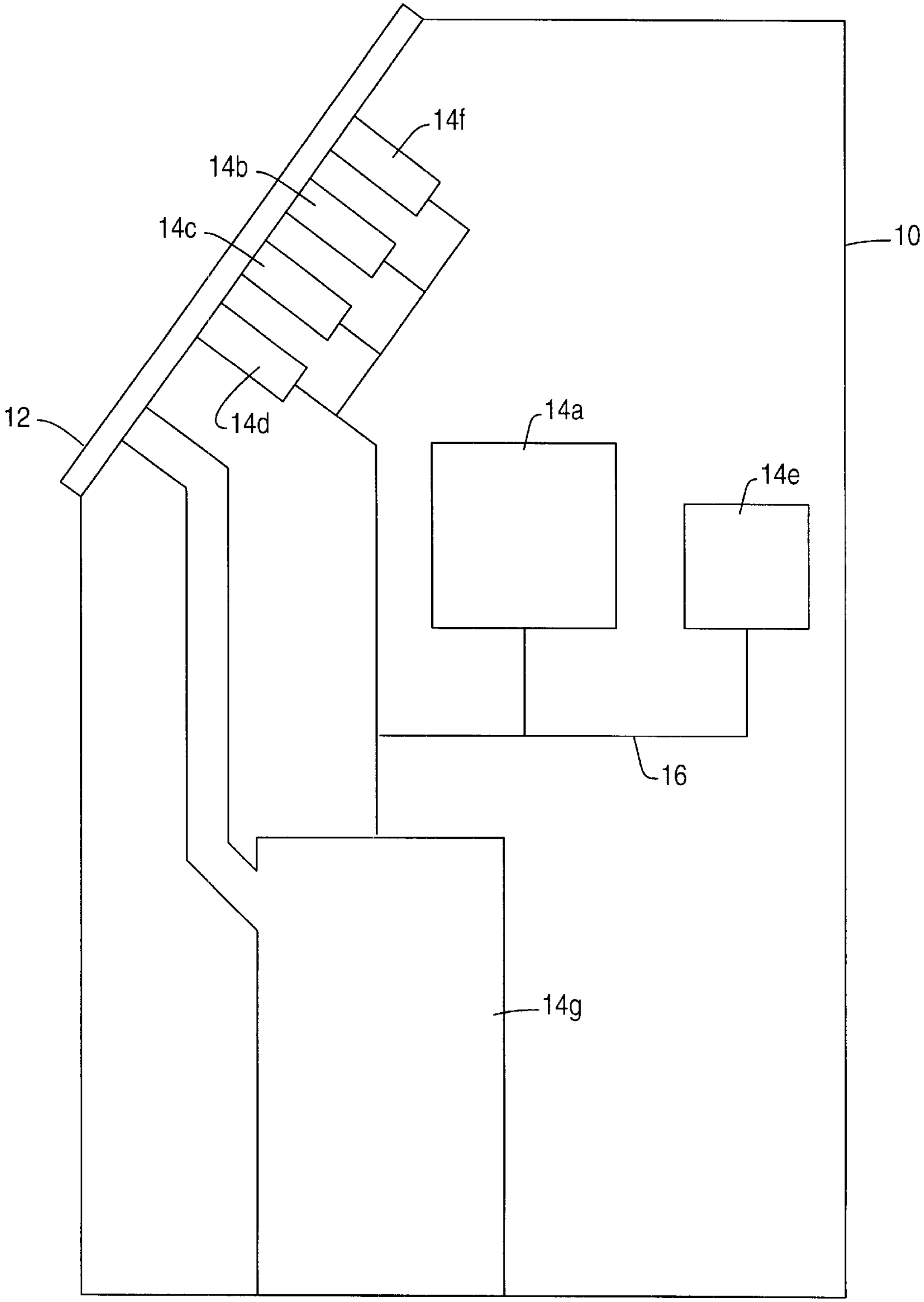
FIG. 1 is a schematic diagram of an SST in accordance with an embodiment of the invention.

Referring to FIG. 1, there is shown a schematic diagram of a public access SST 10 in the form of an ATM in accordance with an embodiment of the present invention. The ATM has a user interface 12 and seven modules 14 interconnected by a proprietary network 16.

The modules 14 comprise a terminal controller 14*a*, a display 14*b*, an encrypting keypad 14*c*, a card reader 14*d*, a journal printer 14*e*, a receipt printer 14*f*, and a cash dispenser 14*g*. The modules 14 operate in a master/slave relationship, where the controller 14*a* is the master that controls the operation of the other modules 14*b* to 14*g*. However, each of the other modules 14*b* to 14*g* has a processor for operating on received data and for lo performing the specific functions of that module 14.

Journal printer 14*e* is internal to the ATM 10 and is used by the owner of the ATM 10 for reconciling transaction data, and by ATM service personnel in the event of a malfunction.

Figure 2:
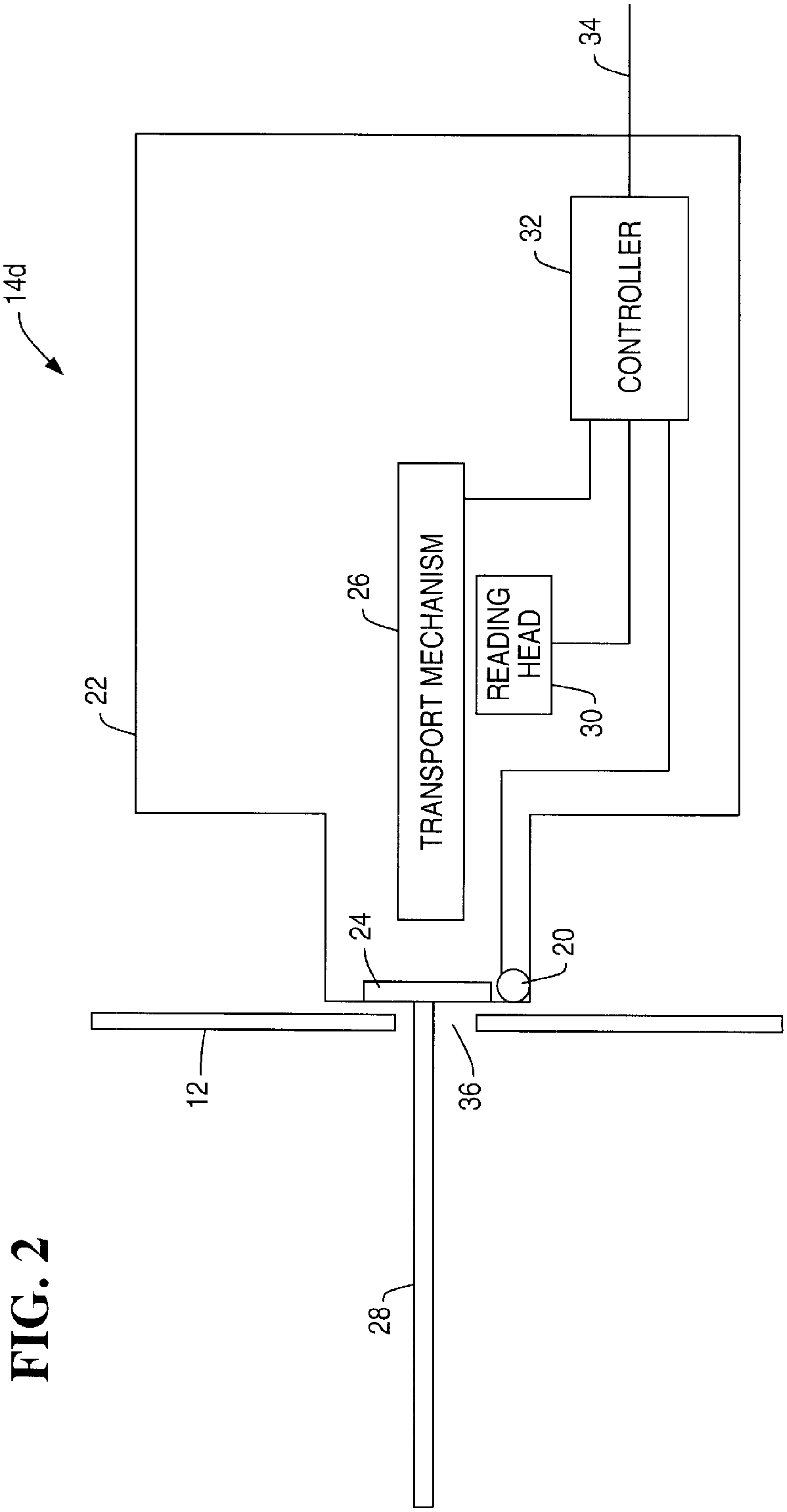
FIG. 2 is a schematic diagram of the card reader module shown in FIG. 1.

Referring to FIG. 2, there is shown a simplified schematic diagram of the card reader module 14*d* aligned with the user interface 12.

Module 14*d* is similar to a conventional card reader (such as a Sankyo motorized card reader module), but has a search coil 20 wound around a ferrite rod for detecting metal (shown in section for clarity). The search coil 20 is located in a throat 22 of the module 14*d*. The search coil is of the type conventionally used in metal detector apparatus, but is of a suitable size for being accommodated within the throat 22 of a card reader module 14*d*. A suitable search coil is provided in a product called 'The Bullseye', which is supplied by Whites Electronics UK Ltd, 35J Harbour Road, Inverness, IV1 1UA.

Module 14*d* has an entry/exit slot 24 at the front of the throat 22 for receiving a card into and for ejecting a card from the module 14*d*.

Slot 24 includes a pair of rollers (not shown) to guide an inserted card onto a transport mechanism 26. Transport mechanism 26 conveys a card 28 between the entry/exit slot 24 and a magnetic card reading head 30. The search coil 20, the card reading head 30, and the transport mechanism 26 are all controlled by a controller 32. The controller 32 and transport mechanism 26 form a transport system.

The controller 32 is implemented in hardware and software, and is responsible for activating the transport mechanism 26, interfacing with the terminal controller 14*a* (FIG. 1), and sending information received from the reading head 30 to the terminal controller 14*a* via output 34. Controller 32 may also implement encryption to provide security for the information sent to the terminal controller 14*a*. Controller 32 also monitors the output of the search coil 20 so that if the search coil detects the presence of metal for longer than a predetermined time period, for example one minute, then the controller 32 informs the terminal controller 14*a* by conveying an alarm signal via output 34.

On receiving an alarm signal, the terminal controller 14*a* may alert a remote host or control center, and/or the controller 14*a* may put the ATM 10 out of service.

If a third party attempts to locate a fraudulent card reader module on the user interface 12 of ATM 10, in the vicinity of a card reader slot 36, then the search coil 20 will detect the metal used in the fraudulent card reader head and send a signal to the controller 32. When the signal has been detected for more than the predetermined time limit (one minute) the controller initiates an alarm signal and conveys this on output 34 to the terminal controller 14*a*. Controller 14*a* relays this signal to a control center (not shown) and removes the ATM 10 from service.

Thus, this embodiment detects fraudulent card reader modules and alerts the ATM to the presence of these modules.

Figure 3:
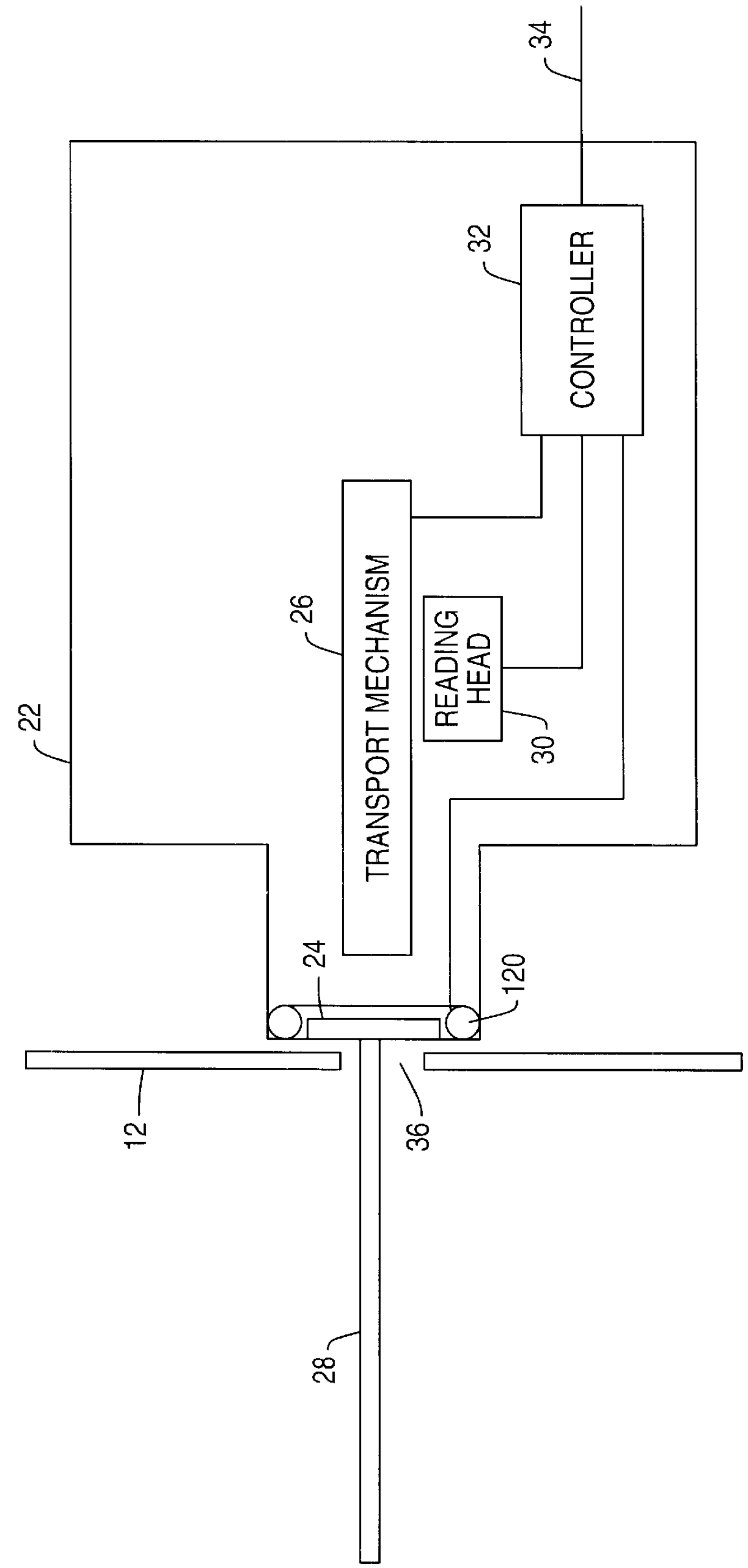
FIG. 3 is a schematic diagram of an alternative embodiment of the card reader shown in FIG. 1.

FIG. 3 is a schematic diagram of an alternative embodiment of the card reader shown in FIG. 1. The only difference between FIG. 2 and FIG. 3 is that search coil 120 in FIG. 3 is annular in shape and does not have a ferrite core; whereas the search coil 20 in FIG. 2 is rod-shaped and has a ferrite core.

Various modifications may be made to the above described embodiment within the scope of the invention. For example, the predetermined time limit may be more or less than one minute. More than one search coil may be used, for example, one search coil may be located in the vicinity of the encrypting keypad, another in the vicinity of the cash dispense slot. In other embodiments, the search coil may have any convenient shape and may or may not include a ferrite core. In other embodiments, the controller 32 may close the entry/exit slot 24 to ensure that cards 28 cannot be inserted therein. In other embodiments, the anti-fraud device may be used in conjunction with a camera that is directed to the outside of the user interface 12, so that on detecting metal in the vicinity of the anti-fraud device, the camera may capture an image of the user interface and relay this image to security personnel at a remote center.

What is claimed is:

1. A self-service terminal comprising:

means defining a user interface element including a magnetic card reader; and an anti-fraud device for detecting metal in an alien card reader positioned in the front vicinity of the magnetic card reader.

2. A self-service terminal according to claim 1, wherein the anti-fraud device comprises a search coil which is located in the vicinity of the user interface element.

3. A self-service terminal according to claim 2, further comprising a card reader module which comprises the search coil.

4. A self-service terminal according to claim 3, wherein the card reader module includes means defining a throat in which the search coil is located.

5. A self-service terminal according to claim 3, wherein (i) the card reader module includes means defining an entry/exit slot, and (ii) the search coil is annular in shape so that the coil surrounds the entry/exit slot.

6. A self-service terminal comprising:

means defining a user interface element including a magnetic card reader;

an anti-fraud device for detecting presence of metal in an alien card reader positioned in the front vicinity of the magnetic card reader; and a controller for generating an alert signal when presence of metal in the front vicinity of the magnetic card reader is detected for more than a predetermined amount of time.

7. A self-service terminal according to claim 6, wherein the anti-fraud device comprises a search coil which is located in the vicinity of the user interface element.

8. A self-service terminal according to claim 7, further comprising a card reader module which comprises the search coil.

9. A self-service terminal according to claim 8, wherein the card reader module includes means defining a throat in which the search coil is located.

10. A self-service terminal according to claim 8, wherein (i) the card reader module includes means defining an entry/exit slot, and (ii) the search coil is annular in shape so that the coil surrounds the entry/exit slot.

11. A self-service terminal according to claim 8, wherein the search coil includes a ferrite core and is rod-shaped.

12. An anti-fraud device for use with a self-service terminal having at least one user interface element including a magnetic card reader, the anti-fraud device comprising:

a search coil for detecting metal in an alien card reader positioned in the front vicinity of the magnetic card reader.

13. An anti-fraud device according to claim 12, wherein the search coil is annular in shape.

14. An anti-fraud device according to claim 12, wherein the search coil is rod-shaped.

15. A method of preventing fraud at a self-service terminal having a user interface element including a magnetic card reader, the method comprising:

searching for metal in an alien card reader positioned in the front vicinity of the magnetic card reader; and generating an alert signal in response to detecting metal in the front vicinity of the magnetic card reader.

16. A method according to claim 15, further comprising:

determining the length of time for which metal has been detected; and comparing the length of time for which metal has been detected with a predetermined time.

17. A method according to claim 16, wherein generating an alert signal comprises:

generating an alert signal if the length of time exceeds the predetermined time.

18. An automated teller machine comprising:

a user interface panel having a slot for receiving a magnetic card;

a magnetic card reader module disposed behind said slot; and means for detecting an alien card reader in front of said slot.

19. A machine according to claim 18 wherein said detecting means are configured for detecting metal in front of said slot.

20. A machine according to claim 19 wherein said detecting means are disposed behind said slot.

21. A machine according to claim 20 wherein said detecting means comprise:

a search coil disposed between said panel slot and an entry slot of said card reader module; and a controller operatively joined to said search coil.

22. A machine according to claim 21 wherein said search coil is wound around a ferrite rod.

23. A machine according to claim 21 wherein said search coil is annular without a ferrite core, and surrounds said entry slot.

24. A machine according to claim 21 wherein said controller is configured to monitor output of said coil for a predetermined time period to determine presence of metal in front of said panel slot.

25. A machine according to claim 21 wherein said coli has a short detecting range less than about 10 cm.

26. A machine according to claim 21 wherein said card reader module further includes a transport mechanism disposed behind said coil for pulling said card through said panel slot and entry slot.

* * * * *